A. REUBOLD.
HAM BONING DEVICE.
APPLICATION FILED JUNE 16, 1922.
1,435,877.
Patented Nov. 14, 1922.
Fig. 4.
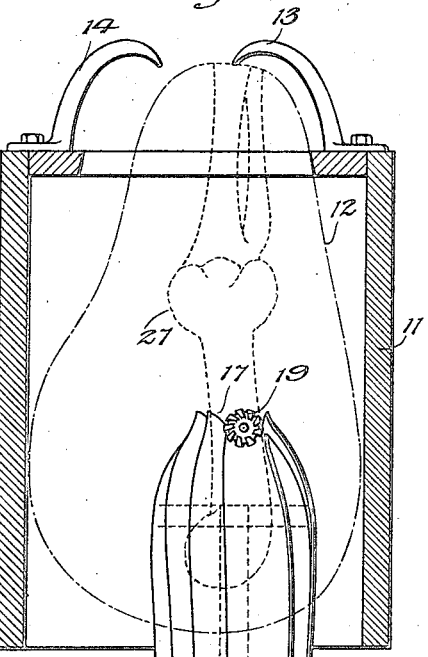
Fig. 1.
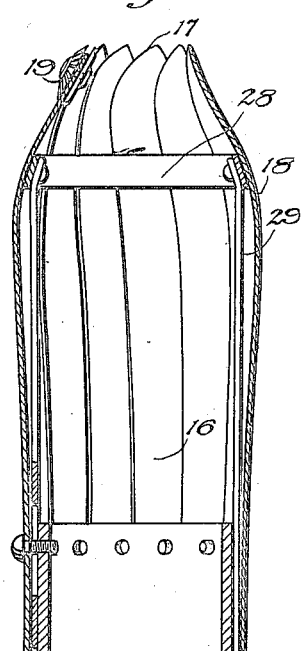
Fig. 2.
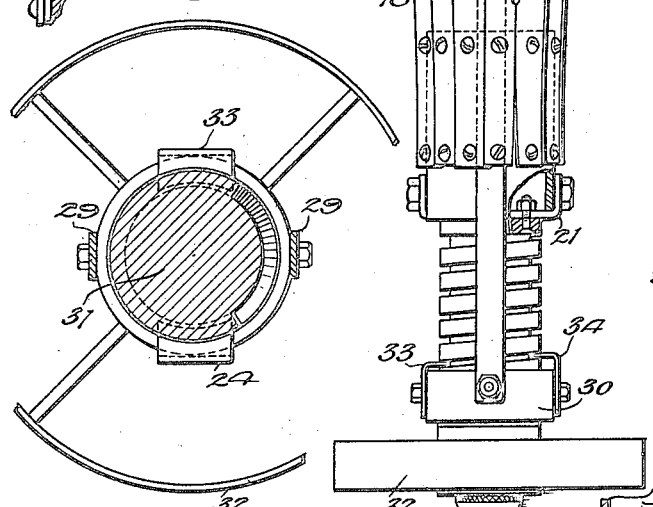
Fig. 3.
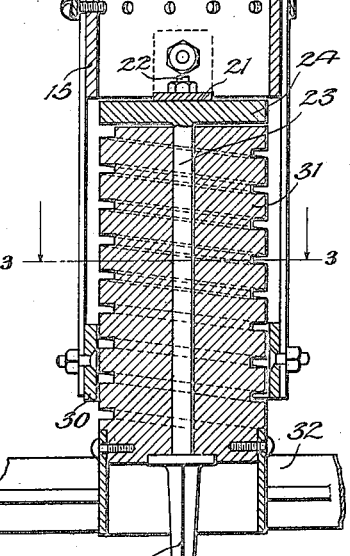
WITNESSES
E. A. Wilson
A. L. Kitchin
INVENTOR
Adam Reubold
BY Munn & Co.
ATTORNEYS Patented Nov. 14, 1922.

1,435,877

UNITED STATES PATENT OFFICE.

ADAM REUBOLD, OF NEW YORK, N. Y.

HAM-BONING DEVICE.

Application filed June 16, 1922. Serial No. 568,764.

*To all whom it may concern:*

Be it known that I, ADAM REUBOLD, a citizen of the United States, and a resident of the city of New York, borough of the Bronx, in the county of Bronx and State of New York, have invented a new and Improved Ham-Boning Device, of which the following is a full, clear, and exact description.

This invention relates to devices for removing bones from hams and particularly to a rotatable machine which may be driven by power or hand operated.

The object of the invention is to provide a simple but effective construction which may be readily adjusted to cut out or remove the bone of a ham of any desired size.

Another object of the invention is to provide a device for removing ham bones which may be manually actuated and manually adjusted during the operation so that the human element or judgment is present.

A still further object is to provide a simple, readily operated construction which may be manually adjusted during the cutting operation in order that the device may readily pass over the reduced and enlarged bone sections.

In the accompanying drawing—

Figure 1 is a side view of a boning device embodying the invention, the same being shown in operation and in connection with a boning device for a ham.

Figure 2 is an enlarged vertical section through the boning device shown in Figure 1.

Figure 3 is a fragmentary sectional view through Figure 2 on line 3—3.

Figure 4 is a fragmentary sectional view showing a modified construction to that illustrated in Figure 2.

Referring to the accompanying drawing by numerals, 11 indicates a container or holder for a ham 12, said holder having preferably hooks 13 and 14 for engaging and holding the ham against movement. In operating the boning device, some form of holding is desirable though not essential. The boning device is provided with what may be termed a body 15 which is a tubular shell and to which a number of resilient metallic cutters 16 are secured by screws or in any other desired manner. These cutters overlap each other and are rounded at their cutting ends 17. The ends 17 are sharpened as well as rounded and act to cut the meat away from the bone, it being noted from Figure 2 that the cutters 16 are curved at 18 and when permitted to do so will present a restricted opening at the cutting ends 17. One of the cutting members 16 is slightly shortened and provided with a rotatable roughened wheel 19 which acts to prevent the other cutters from gouging into or cutting the bone. The wheel 19 is rotatable and extends to a point in line with the extreme outer ends of the cutters 16.

Under some circumstances it may be desired to construct the modified form shown in Figure 4 wherein an extra blade 16' is provided which extends beyond the other cutters 16 and which is curved at 20 to perform the same function as the wheel 19, namely, to prevent the cutters 16 from cutting the bone. It will be, of course, understood that injury to the bone by cutting is not objectionable but it is undesirable to have the cutters enter the bone as this action would prevent the rotation of the device and consequently, proper cutting of the meat from the bone.

At the end of the body 15 opposite that carrying the cutters 16 is a cross bar 21 which is bolted or otherwise rigidly secured in place and which receives the threaded extension 22 of the power rod 23 which power rod is provided with a disk 24, said disk being either integral with the rod 23 or rigidly secured thereto. The end 25 of rod 23 may be of any desired shape, as for instance, square to receive an ordinary brace 26 though if desired it could be made to receive any desired driving means which would rotate the shaft 23 and, consequently, rotate body 15 and the parts associated therewith.

In operating the device, it is placed in position with the cutting ends 17 against the end of the bone and then rotated and gradually forced into the ham and in fact entirely through the ham. In forcing the cutters through the ham they must pass in an enlarged section 27 of the bone. In order to do this the cutting ends 17 must be separated more and more and in fact until the opening provided is sufficient to permit these cutting ends to pass over the enlargement. The means provided for enlarging the opening for receiving the bone includes the spreading ring 28 and a plurality of shift bars 29, ring 28 slidingly engaging the cutters 16 and as it is moved toward the cutting ends 17, said cutting ends will be separated whereby the diameter of the opening is increased. The shift bars 29 extend between the body 15 and certain of the cutters 16 and are rigidly secured to a ring 30 which ring is slidingly mounted on a screw 31, which screw has an adjusting wheel 32 rigidly secured thereto, said adjusting wheel being manually operated for shifting the ring 30 and, consequently, for shifting the position of the bars 29 and ring 28. Clips or brackets 33 and 34 are rigidly secured to ring 30 and extend into the grooves of the screw 31 and act in the order of threads co-acting with the threads of the screw 31.

It will be noted that when the wheel 32 is rotated for causing the ring 30 to travel toward body 15, the cutting ends 17 will be spread apart whereas when the wheel 32 is released, ring 28 will be pulled toward body 15 and the resilient action of the cutting bar 16 will cause them to move together and restrict the cutting opening.

In operation, when the ham is placed in the holder 11, the cutting ends 17 are placed against the end of the bone and the device rotated and pressed inwardly. The wheel 32 is rotated for adjusting the parts from time to time as necessary to permit the cutting ends of the cutters 16 to pass over the various enlargements of the bone. After the device has cut from one end to the other of the ham, it is withdrawn and the device is then ready to remove the bone from another ham.

What I claim is:—

1. A device for removing bones from hams, comprising a number of cutter blades arranged substantially as a tube, means for rotating said cutter blades, and means for expanding and contracting one end thereof.

2. A device for removing bones from hams, comprising a group of cutter blades sharpened at the ends and arranged substantially as a tube, means for expanding the end of said tube at which the sharpened ends are positioned, and means for rotating said tube as it is forced into the ham.

3. A device for removing bones from hams, comprising a tubular group of cutting blades, said blades overlapping each other, each of said blades being sharpened at one end so that when the blades are forced into a ham and rotated, said sharpened ends will cut the meat off the bone, means for rotating said blades, and means for preventing the sharpened ends of the blades from cutting the bone.

4. A device for removing bones from hams, comprising a body, a plurality of blades extending from said body forming a tubular section thereof, each of said blades at the end opposite said body being sharpened and pointed, means for expanding said blades at their shortened ends, and means for rotating said blades.

5. A device for removing bones from meat, comprising a body, a plurality of blades connected to said body forming a tubular extension thereof, said blades overlapping each other longitudinally, each of said blades being sharpened and pointed at the ends opposite said body, and means for rotating said body and blades.

6. A device for removing bones from meat, comprising a tubular group of cutting blades sharpened and pointed at one end, a ring arranged within said tubular group of blades, means for moving said ring so as to cause said blades to separate, and means for rotating said blades.

7. A device for removing bones from meat, comprising a group of blades forming a tube, said blades being bent at one end so as to restrict the opening of the tube at that end, the bent end of said blades being sharpened, a ring arranged in said tube, means for moving said ring against said bent ends for separating the blades and thereby increasing the entrance to the tube, and means for rotating said tube.

8. In a device for removing bones from meat, a plurality of blades arranged substantially in a tube, said blades being bent at one end for causing a restricted opening at that end of the tube, said blades at the bent ends being sharpened, a ring arranged interiorly of said tube, a plurality of rods for moving the ring longitudinally of the tube, said blades being resilient and tending to move together, rotatable means for shifting said ring longitudinally of the tube for expanding said blades, and means for rotating said tube.

9. A device for removing bones from meat, comprising a plurality of resilient blades arranged in a tube and shortened at one end, the sharpened ends of the blades forming said tube being bent for restricting that end of the tube, a longitudinally movable ring arranged in the tube and adapted to engage said bent ends for spreading the ends, a plurality of reciprocating rods connected to said ring, a rotatably threaded member, means extending from said rod into the grooves of said rotatably threaded member whereby when the rotatably threaded member is rotated said rods will be moved longitudinally, and means for rotating said tube.

10. In a device for removing bones from meat, a cutting section, means for rotating said cutting section, and adjusting means for said cutting section, said adjusting means including a plurality of reciprocating bars, a screw member, and a ring rigidly secured to said bars surrounding said screw member and provided with depending members fitted into the grooves of the screw member.

11. In a device for removing bones from meat, a plurality of cutting blades arranged in a tube, means for rotating said tube, and a guard wheel mounted on one of said blades near the cutting end for preventing the blades from cutting the bone being removed.

12. In a device for cutting bones from meat, a plurality of cutting blades arranged in a tube, means for rotating said tube, and means for preventing the cutting parts of the blades from cutting the bone being removed, said last mentioned means including a guard substantially the same shape as the cutting blades for almost its full length, said guard being bent at the end, said bent end being positioned near the cutting parts of said cutting blades.

ADAM REUBOLD.